(12) United States Patent
Goggin et al.

(10) Patent No.: US 10,783,917 B1
(45) Date of Patent: *Sep. 22, 2020

(54) RECORDING HEAD WITH TRANSFER-PRINTED LASER DIODE UNIT FORMED OF NON-SELF-SUPPORTING LAYERS

(71) Applicant: Seagate Technology LLC, Cupertino, CA (US)

(72) Inventors: Aidan Dominic Goggin, Donegal (IE); Mark Anthony Gubbins, Donegal (IE); Paula Frances McElhinney, Londonderry (GB); Roger L. Hipwell, Jr., Eden Prairie, MN (US); John Wolf, Maple Grove, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,708

(22) Filed: Feb. 6, 2019

Related U.S. Application Data

(63) Continuation of application No. 15/812,027, filed on Nov. 14, 2017, now abandoned.

(60) Provisional application No. 62/427,253, filed on Nov. 29, 2016.

(51) Int. Cl.
*G11B 11/00* (2006.01)
*G11B 11/105* (2006.01)
*G11B 5/00* (2006.01)

(52) U.S. Cl.
CPC .. *G11B 11/10536* (2013.01); *G11B 11/10504* (2013.01); *G11B 2005/0021* (2013.01); *G11B 2220/2525* (2013.01)

(58) Field of Classification Search
None
See application file for complete search history.

(56) References Cited

U.S. PATENT DOCUMENTS

| | | |
|---|---|---|
| 5,127,081 A | 6/1992 | Koren et al. |
| 6,262,949 B1 | 7/2001 | Inoue et al. |
| 6,294,450 B1 | 9/2001 | Chen et al. |
| 6,771,589 B2 | 8/2004 | Ueyanagi et al. |
| 7,622,367 B1 | 11/2009 | Nuzzo et al. |
| 7,675,716 B2 | 3/2010 | Kagami et al. |
| 7,898,759 B2 | 3/2011 | Matsumoto et al. |
| 7,972,875 B2 | 7/2011 | Rogers et al. |
| 7,998,330 B2 | 8/2011 | Fang et al. |
| 8,076,246 B2 | 12/2011 | Tanaka et al. |
| 8,094,523 B2 | 1/2012 | Kamijima et al. |
| 8,134,794 B1 | 3/2012 | Wang |

(Continued)

OTHER PUBLICATIONS

Stadler et al., "Integrated Magneto-Optical Materials and Isolators: A Review", IEEE Photonics Journal, 2013, 16 pages.

(Continued)

*Primary Examiner* — Peter Vincent Agustin
(74) *Attorney, Agent, or Firm* — Mueting Raasch Group

(57) ABSTRACT

A recording head includes a substrate, a read transducer, a waveguide core, and a near-field transducer at an end of the waveguide core proximate a media-facing surface. The recording head includes a magnetic write pole and coil. A laser diode unit with one or more non-self-supporting layers of crystalline material region is transfer printed between layers of the recording head.

20 Claims, 8 Drawing Sheets

(56) References Cited

U.S. PATENT DOCUMENTS

| | | |
|---|---|---|
| 8,170,389 B1 | 5/2012 | Komura et al. |
| 8,247,095 B2 | 8/2012 | Champion et al. |
| 8,254,212 B2 | 8/2012 | Snyder et al. |
| 8,254,214 B2 | 8/2012 | Shimazawa et al. |
| 8,261,660 B2 | 9/2012 | Menard |
| 8,295,003 B2 | 10/2012 | Chou et al. |
| 8,295,010 B2 | 10/2012 | Shimazawa et al. |
| 8,310,776 B2 | 11/2012 | Wilson |
| 8,310,903 B1 * | 11/2012 | Takayama .............. G11B 5/105 29/603.01 |
| 8,322,022 B1 * | 12/2012 | Yi ........................... G11B 5/314 29/603.13 |
| 8,333,860 B1 | 12/2012 | Bibl et al. |
| 8,345,517 B2 | 1/2013 | Hurley et al. |
| 8,418,353 B1 | 4/2013 | Moravec et al. |
| 684,848 A1 | 6/2013 | Gasparino |
| 8,456,969 B1 * | 6/2013 | Mooney ................. G11B 5/314 369/112.27 |
| 8,498,183 B1 * | 7/2013 | Sasaki .................. G11B 5/1278 369/13.13 |
| 8,501,536 B2 | 8/2013 | Mooney et al. |
| 8,518,204 B2 | 8/2013 | Hu et al. |
| 8,554,930 B2 | 10/2013 | Blakley, III et al. |
| 8,599,652 B2 | 12/2013 | Tomikawa et al. |
| 8,611,193 B2 | 12/2013 | Hipwell et al. |
| 8,721,902 B1 | 5/2014 | Wang et al. |
| 8,755,650 B2 | 6/2014 | Peng |
| 8,854,930 B1 * | 10/2014 | Clinton ................ G11B 7/1263 360/125.32 |
| 8,885,280 B1 | 11/2014 | Huang et al. |
| 8,995,088 B1 | 3/2015 | Boone et al. |
| 9,001,628 B1 | 4/2015 | Shi et al. |
| 9,019,661 B2 | 4/2015 | Rea et al. |
| 9,047,912 B1 | 6/2015 | Peng et al. |
| 9,099,130 B2 | 8/2015 | Gubbins et al. |
| 9,099,139 B2 | 8/2015 | Gage et al. |
| 9,105,286 B2 | 8/2015 | Boone, Jr. |
| 9,147,427 B1 | 9/2015 | Lee et al. |
| 9,177,585 B1 * | 11/2015 | Seki ...................... G11B 5/7325 |
| 9,202,489 B2 | 12/2015 | Gokemeijer et al. |
| 9,218,836 B2 | 12/2015 | Itagi et al. |
| 9,236,081 B1 | 1/2016 | Chu et al. |
| 9,251,819 B2 | 2/2016 | Peng |
| 9,251,837 B2 | 2/2016 | Zhu et al. |
| 9,281,659 B1 | 3/2016 | Tatah et al. |
| 9,322,997 B2 | 4/2016 | Peng |
| 9,336,831 B2 | 5/2016 | Burnett et al. |
| 9,349,402 B2 | 5/2016 | Chen et al. |
| 9,355,662 B2 | 5/2016 | Peng et al. |
| 9,424,867 B2 | 8/2016 | Peng |
| 9,437,229 B2 | 9/2016 | Tatah |
| 9,443,545 B2 | 9/2016 | Mosendz et al. |
| 9,460,740 B1 | 10/2016 | Staffaroni et al. |
| 9,466,320 B1 | 10/2016 | Staffaroni et al. |
| 9,558,770 B2 | 1/2017 | Yang et al. |
| 9,576,595 B1 | 2/2017 | Hipwell, Jr. et al. |
| 9,583,135 B1 | 2/2017 | Ma et al. |
| 9,607,638 B1 | 3/2017 | Olson et al. |
| 9,646,639 B2 | 5/2017 | Van Orden et al. |
| 9,786,314 B1 | 10/2017 | Peng |
| 9,792,937 B1 | 10/2017 | Goggin et al. |
| 9,799,359 B1 | 10/2017 | Olson et al. |
| 9,875,761 B1 | 1/2018 | Mehfuz et al. |
| 9,978,409 B2 | 5/2018 | Peng |
| 9,984,719 B2 | 5/2018 | Matousek et al. |
| 10,014,016 B1 | 7/2018 | Mehfuz et al. |
| 10,036,851 B1 | 7/2018 | Peng et al. |
| 10,061,082 B1 | 8/2018 | Peng et al. |
| 10,061,088 B1 | 8/2018 | Peng |
| 10,062,400 B1 | 8/2018 | Harvey et al. |
| 10,069,029 B1 | 9/2018 | Olson et al. |
| 10,121,496 B1 | 11/2018 | Peng et al. |
| 10,127,938 B2 | 11/2018 | Goggin et al. |
| 10,186,292 B1 | 1/2019 | Krishnamurthy et al. |
| 10,249,326 B1 | 4/2019 | Peng |
| 10,255,940 B1 | 4/2019 | Macken et al. |
| 10,310,182 B2 | 6/2019 | Ju et al. |
| 10,388,310 B1 | 8/2019 | Harvey et al. |
| 2004/0191700 A1 | 9/2004 | Kuwabara et al. |
| 2004/0200368 A1 | 10/2004 | Ogino et al. |
| 2005/0213436 A1 | 9/2005 | Ono et al. |
| 2007/0215480 A1 | 9/2007 | Fang et al. |
| 2009/0018891 A1 | 1/2009 | Eder |
| 2009/0217517 A1 | 9/2009 | Pique et al. |
| 2010/0283069 A1 | 11/2010 | Rogers et al. |
| 2011/0018158 A1 | 1/2011 | Menard |
| 2011/0138600 A1 | 6/2011 | Oggioni et al. |
| 2011/0216635 A1 | 9/2011 | Masumoto |
| 2011/0217003 A1 | 9/2011 | Gage et al. |
| 2012/0051196 A1 * | 3/2012 | Grobis ................... B82Y 10/00 369/13.24 |
| 2012/0084969 A1 * | 4/2012 | Tanaka ................... G11B 5/314 29/603.01 |
| 2012/0163138 A1 * | 6/2012 | Gage ...................... G11B 5/314 369/13.11 |
| 2012/0201107 A1 * | 8/2012 | Peng ..................... G11B 5/6088 369/13.24 |
| 2013/0108212 A1 | 5/2013 | Peng et al. |
| 2013/0223196 A1 | 8/2013 | Gao et al. |
| 2013/0230071 A1 | 9/2013 | Haensel et al. |
| 2013/0316487 A1 | 11/2013 | de Graff et al. |
| 2013/0330853 A1 | 12/2013 | Tischler |
| 2014/0241137 A1 | 8/2014 | Jin et al. |
| 2014/0373898 A1 | 12/2014 | Rogers et al. |
| 2015/0036468 A1 | 2/2015 | Boone, Jr. |
| 2016/0118071 A1 | 4/2016 | Hirotsune et al. |
| 2016/0195676 A1 | 7/2016 | Yu et al. |
| 2018/0040344 A1 * | 2/2018 | Hutchinson .......... G11B 5/6082 |
| 2018/0211685 A1 | 7/2018 | Mehfuz et al. |
| 2020/0098391 A1 | 3/2020 | Goggin et al. |

OTHER PUBLICATIONS

File History for U.S. Appl. No. 16/170,196 as retrieved from the U.S. Patent and Trademark Office.

Kim et al., "Printable, Flexible, and Stretchable Forms of Ultrananocrystalline Diamond with Applications in Thermal Management", Advanced Materials, vol. 20, 2008, pp. 2171-2176.

Gubbins et al., U.S. Appl. No. 16/170,192, filed Oct. 25, 2018.

Gubbins et al., U.S. Appl. No. 16/263,308, filed Jan. 31, 2019.

Habibi et al., U.S. Appl. No. 16/211,945, filed Dec. 6, 2018.

McGurk et al., U.S. Appl. No. 16/432,100, filed Jun. 5, 2019.

Harvey et al., U.S. Appl. No. 16/528,1742, filed Jully 31, 2019.

Mehfuz et al., U.S. Appl. No. 161433,467, filed Jun. 6, 2019.

* cited by examiner

RECORDING HEAD WITH TRANSFER-PRINTED LASER DIODE UNIT FORMED OF NON-SELF-SUPPORTING LAYERS

RELATED PATENT DOCUMENTS

This is a continuation of patent application Ser. No. 15/812,027, filed Nov. 14, 2017, which claims the benefit of Provisional Patent Application No. 62/427,253 filed on Nov. 29, 2016, all of which are incorporated herein by reference in their entireties.

SUMMARY

The present disclosure is directed to a recording head with a transfer-printed laser diode unit formed of non-self-supporting layers. In one embodiment, a recording head includes a substrate and a read transducer deposited over the substrate. A waveguide core is deposited over the read transducer, and a near-field transducer is at an end of the waveguide core proximate a media-facing surface. A magnetic write pole and coil are deposited over the waveguide core. The recording head includes a laser diode unit with one or more non-self-supporting layers of crystalline material region. The laser diode unit is transfer printed below at least the waveguide core. An optical coupler is configured to receive light from the laser diode unit and couple the light to the waveguide core. The coupled light causes plasmons to be directed to a recording medium via the near-field transducer. In other embodiments, the laser diode unit is transfer printed above the magnetic write pole and coil.

In another embodiment, a recording head includes a substrate and a laser diode unit with one or more non-self-supporting layers of crystalline material region is transfer printed over the substrate. A return pole is deposited over the substrate such that a substrate parallel plane of the return pole intersects the laser diode unit. A waveguide core is deposited over the return pole and the laser diode unit, and a near-field transducer is at an end of the waveguide core proximate a media-facing surface. A magnetic write pole and coil are deposited above the waveguide core and a read transducer is deposited above the magnetic write pole and coil. An optical coupler is configured to receive light from the laser diode unit and couple the light to the waveguide core.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
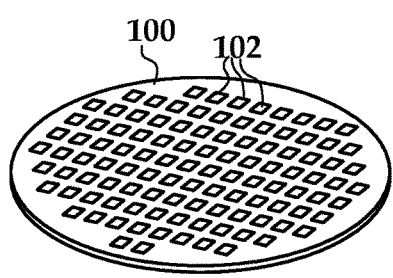
FIGS. 1-5 are diagrams showing a transfer printing process according to an example embodiment.

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR read/write head, a near-field transducer concentrates optical energy into a tiny optical spot in a recording layer, which raises the media temperature locally. The hotspot reduces the writing magnetic field required for high-density recording.

In current implementations, the read/write head and laser diode are formed using separate processes, aligned using a surface-mount placement process (e.g., pick and place), and bonded together (e.g., using solder). While this type of assembly process is well-established for assembly of electronic components, there are challenges in mass-assembly of HAMR read/write heads using these processes.

One challenge in assembling laser diodes onto a read/write head is the precise alignment needed. While electrical components can operate if misaligned so long as the conductive paths are sufficiently established, misalignment between a laser and read/write head can result in a loss of optical efficiency that can render the head unusable. Another challenge relates to the size of the resulting assembly. The read/write head has a limited vertical distance (normal to the recording surface) in which to operate. In some implementations, the addition of a laser and intermediate structures (e.g., submounts) can exceed the available spacing. Such additional structure can add undesirable weight, as do the laser packaging and electrical joints that electrically couple the laser to the read/write head.

In the present disclosure, hard drive recording heads are proposed onto which at least part of a semiconductor laser or material to form a laser (e.g., epitaxial layer) is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. Carrying the semiconductor laser with the read/write head substrate, without a separate or intermediate support substrate, can help to reduce the size and simplify the shape and connection methods, and it can also allow for the use of laser geometries and designs that are very different from simple edge-emitting cleaved facet lasers that have been proposed in the past. The present disclosure describes the use of transfer print technology to integrate laser diodes within the slider body of a HAMR head.

In at least some cases, parts of the laser (e.g., GaAs active region) are incompatible with epitaxial growth on the target substrate of a slider, which may be formed of a dielectric such as alumina. As such, the laser cannot be formed using the same layer deposition processes used to form the magnetic and optical components that are integrated into the head. In embodiments described below, the laser may instead be formed on the substrate by transfer printing a thin, non-self-supporting crystalline layer (epitaxial layer), or a stack of such layers, from a growth substrate on which they were formed to a target substrate. Thereafter, the epitaxial layer and substrate are further processed (e.g., masked etched, further layers added) to form the integrated laser diode unit.

This process of transferring non-self-supporting layers of epitaxial-growth-incompatible layers is referred to herein as On-Wafer Laser (OWL) process integration. This process may also be referred to as transfer printing, dry transfer printing, nanoprinting, etc. In FIGS. 1-5, block diagrams illustrate transfer printing of components onto a recording head according to an example embodiment.

In FIG. 1, a donor substrate 100 includes a number of components 102 (e.g., epitaxial layers) formed using a first process (e.g., crystalline growth). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: epitaxial material layer, adhesion or protection layers, carrier layers (to increase thickness for easier transport), bonding layers to aid in best print transfer, and integration layers to enable subsequent integration (e.g., stop features to allow planarization after integration).

Figure 2:
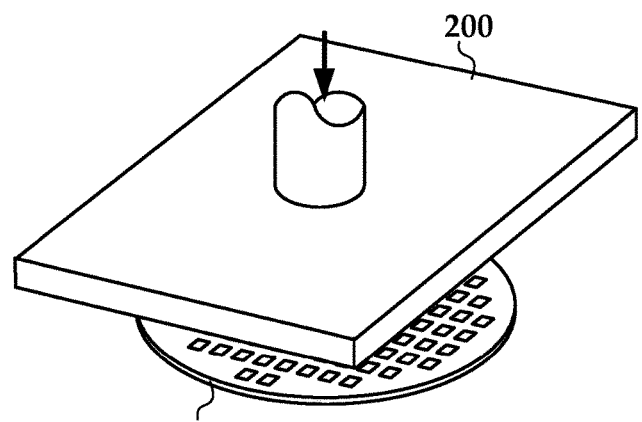
Figure 3:
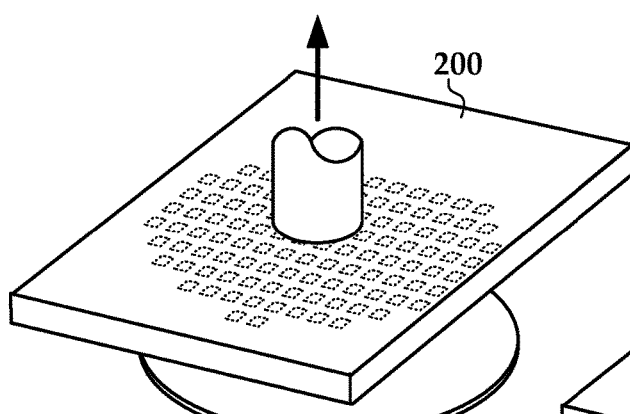

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 210 as shown in FIGS. 4-5.

Figure 4:
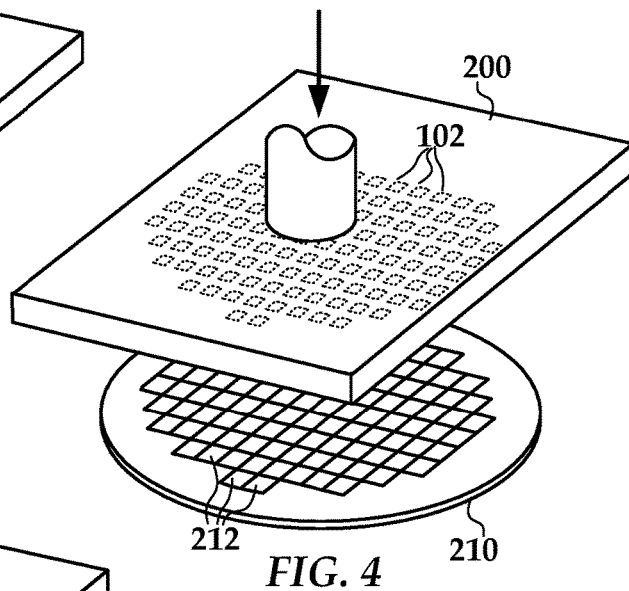
Figure 5:
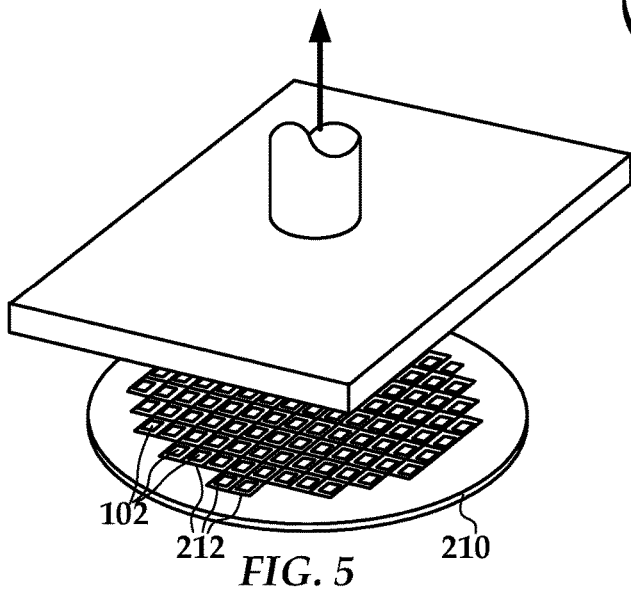

As seen in FIG. 4, the transfer print head 200 is lowered over a wafer 210 that includes a number of partially-processed recording heads 212. The transfer print head 200 presses the components 102 on to the wafer 210 and is then pulled away as seen in FIG. 5. This attaches the components 102 to the recording heads 212. Afterwards, the wafer 210 is further processed, e.g., etching the components 102 to final shape and alignment, and depositing additional layers of material to form the remaining recording head components.

One aspect of the OWL concept is that the transfer printing of the laser epitaxial layers (e.g., GaAs) can have a relatively coarse alignment (e.g. several microns or 10's of microns alignment) with respect to the read/write head elements because the lateral patterning of the laser-defining elements (e.g., electrodes, ridges, facets) can be formed using subsequent wafer-level lithography and therefore will inherently be well-aligned (e.g., sub-micron alignment) to existing wafer alignment features.

Figure 6:
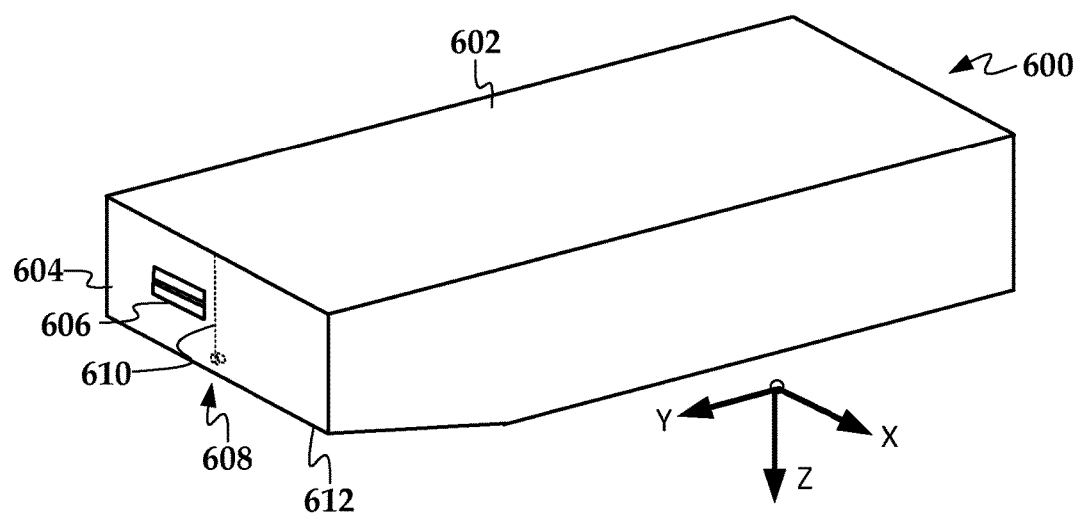
FIG. 6 is a perspective view of a slider according to an example embodiment.

The specific embodiments described below illustrate several possible options for how and where an OWL can be integrated within the slider head. For each of the embodiments, a description is provided of how light may be coupled between the OWL active layer and the waveguides that deliver the light to the near-field transducer. Each of the embodiments may be used in a HAMR read/write head, an example of which is shown in FIG. 6. In this disclosure the terms "read/write head," "slider," "read head," "recording head," "head," etc., may be used interchangeably.

The read/write head 600 shown in FIG. 6 may be used in a magnetic data storage device, e.g., HAMR hard disk drive. The read/write head 100 has a slider body 602 with integrated read/write transducers 608 at a trailing edge 604 that are held proximate to a surface of a magnetic recording medium (not shown), e.g., a magnetic disk. The illustrated read/write head 600 is configured as a HAMR device, an energy source 606 (e.g., laser diode unit) and a waveguide 610, both of which are integrated into the slider body 602. The waveguide 610 delivers electromagnetic energy from the energy source 606 to a near-field transducer (NFT) that is part of the read/write transducers 608. The NFT achieves surface plasmon resonance and directs the energy out of a media-facing surface 612 to create a small hot spot on the recording medium.

Figure 7:
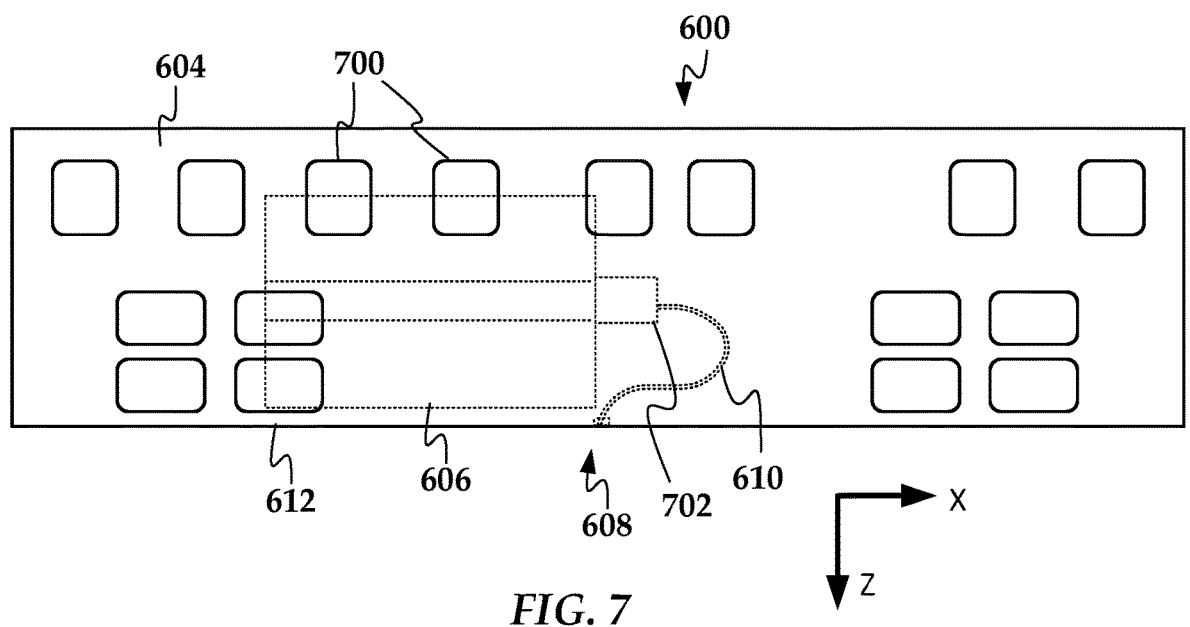
FIG. 7 is a view of the leading edge of the slider shown in FIG. 6.

In FIG. 7, a view of the trailing edge 604 of the slider body 602 shows additional details. The trailing edge surface 604 is parallel to a substrate upon which all of the components are built using layer deposition and transfer printing techniques. The various components integrated into the read/write head 600 (e.g., waveguide 610, energy source 606, read/write transducers 608) are formed by layering thin film upon the substrate. As noted above, the energy source 606 incompatible with growth on the substrate and other material layers, and so is integrated by transfer printing or an equivalent thereof After all of the material layers are deposited, conductive pads 700 are formed on the trailing edge surface 604. The pads 700 are bonded to electrical lines (e.g., flex circuits) that carry signals between the read/write head 600 and controller circuitry of the drive.

Note that the energy source 608 is elongated in the cross-track direction (x-direction in these figures). Generally, the energy source 608 will include an active laser region (also referred to as a quantum well, gain region, etc.) formed of one or more non-self-supporting layers of crystalline material. By orienting the energy source 608 in the cross-track direction, the desired optical output and wavelength can be obtained while minimizing the height of the read/write head 600 (measured normal to the media-facing surface 612). A reduced height read/write head 600 reduces the clearances needed above the slider and allows for closer vertical stacking of disks.

Also seen in FIG. 7 is an optical coupler 702 which efficiently couples light emitted from the energy source 606 to the waveguide 610. For example, the optical coupler 702 may include gradient-index lens, assistant layers (e.g., layers with intermediate refractive index between cladding and core of waveguide) gratings, mirrors, etc., that help direct light into the waveguide 610 with minimal loss. Note that other optical components may be included with the optical coupler 702 and waveguide 610, such as mode converters, phase converters, focusing mirrors (e.g., proximate the near-field transducer), stray light absorbers/blockers, stray light reflectors, etc.

Figure 8:
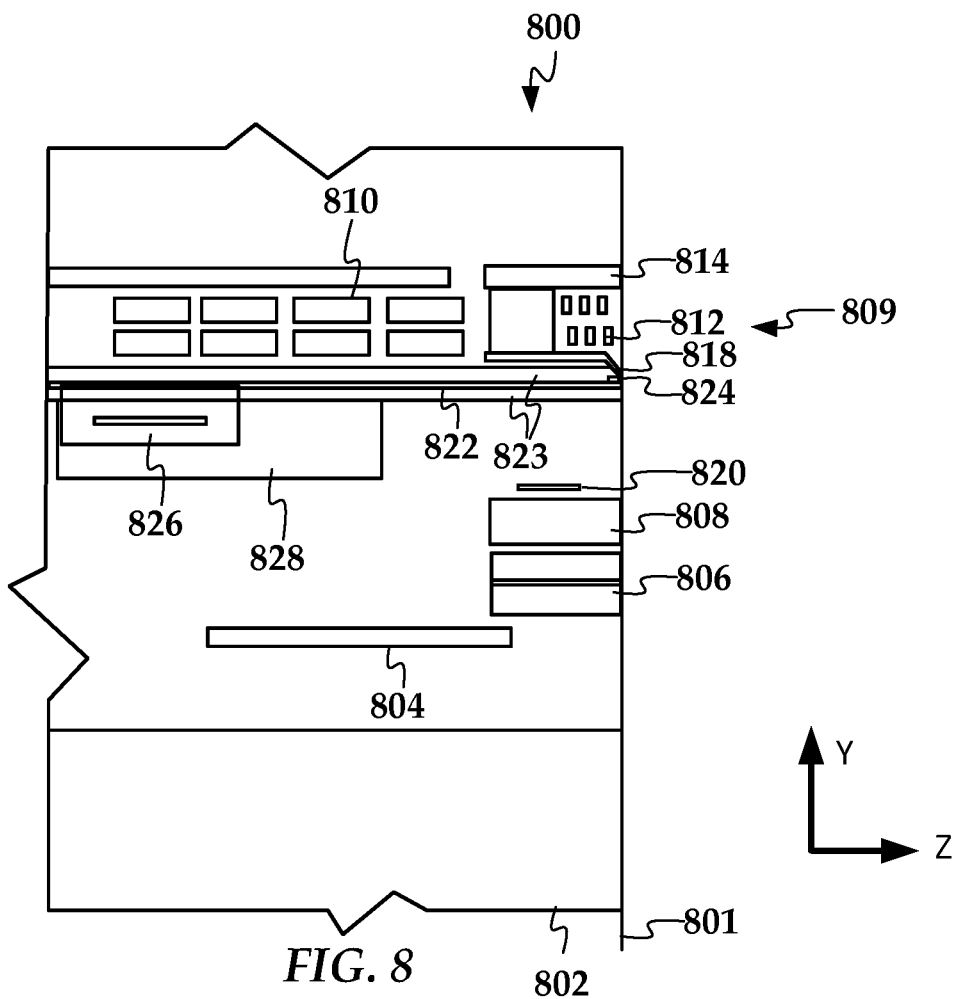
FIGS. 8 and 9 are respective cross-section and trailing edge views of an arrangement of a recording head according to a first example embodiment.
Figure 9:
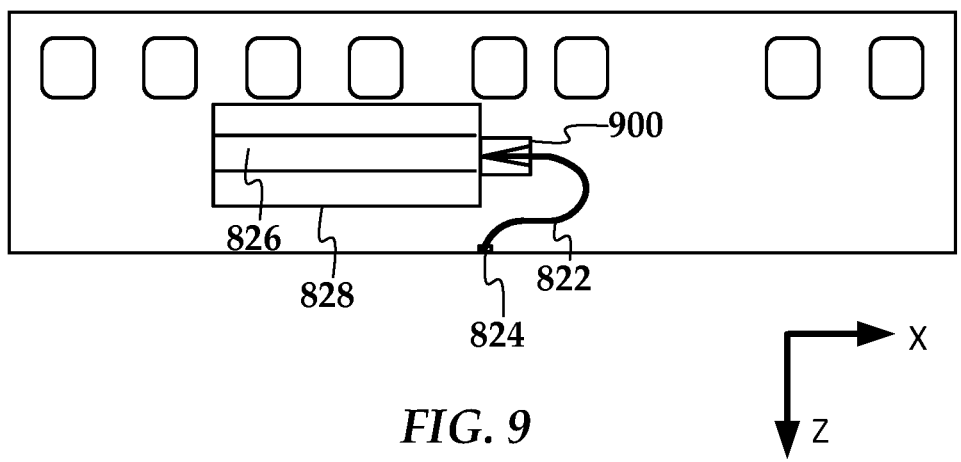

In FIGS. 8 and 9, respective cross-section and trailing edge views show an arrangement of a recording head 800 according to a first example embodiment. The recording head 800 is built upon a substrate 802. A reader heater 804 and read transducer 806 are deposited over the substrate 802. The reader heater 804 induces localized thermal expansion to change a clearance between the read transducer 806 and a recording medium (not shown) that is held next to a media-facing surface 801 of the recording head 800. The read transducer 806 is typically a magnetoresistive device that changes resistance in response to local magnetic fields.

Above the read transducer 806 is a return pole 808 that is part of a magnetic write transducer 809. Also included in the write transducer 809 is a pole 808, coils 810, 812, and second return pole 814. A writer heater 820 controls writer clearance through controlled thermal expansion similar to the reader heater 802. The write transducer 809 may operate similar to a conventional (e.g., perpendicular) magnetic writer, except that additional optical components, such as waveguide core 822, waveguide cladding 823, and NFT 824, provide energy to heat the recording medium while writing.

An active laser region 826 is deposited at or below the waveguide core 822. The active laser region is part of a laser diode unit 828 formed of one or more non-self-supporting layers of crystalline material that. As seen in FIG. 9, an optical coupler 900 is configured to receive light from the active region 826 and couple the light to the waveguide core 822. The optical coupler 900 may include any combination of an assistant layer, tapered waveguide section, grating, mirror, etc. The coupled light causes plasmons to be directed to a recording medium via the near-field transducer 824. Note that the active region 826 (as well as the rest of the laser diode unit 828) is elongated in the cross-track direction (x-direction), and so the waveguide core 822 has a curved shape in order to redirect light from a cross-track direction to a direction normal to the media-facing surface 801. Other optical components may also be placed along the waveguide core 822 between the active laser region 826 and the media-facing surface 801, such as a mode converter, phase converter, stray light blockers/absorbers, etc.

In other embodiments, the active region 826 may be elongated in the z-direction, assuming there is enough room to do so. In such a case, the light will already be emitted in the z-direction and may not need a curved waveguide to direct the light in the z-direction. However, other components such as mirrors and gratings may still be used to direct the light normal to the layers or to offset the light in the cross-track direction even if the light is emitted in the z-direction.

The arrangement shown in FIGS. 8 and 9 can utilize a fairly straight forward light path, as the laser diode unit 828 and waveguide core 822 are at the same or nearly the same layers. In some embodiments, the active region 826 of the laser diode unit 828 can be co-planar with the waveguide core 822. The laser diode unit 828 can be inserted (e.g., transfer printed) fairly late in the build, which can reduce costs. For example if some the earlier deposited components such as read transducer 806 exhibit a defect, the slider (or entire wafer if affecting a large number of readers) can be rejected before attempting the addition of the laser diode unit. Note that this example configuration results in an increase in reader-to-writer separation, and may affect the symmetry and extent of protrusion provided by the heaters 802, 820. Additional structures may be needed to provide cooling for the laser diode unit 828 and to minimize the effects of thermally-induced strain.

Figure 10:
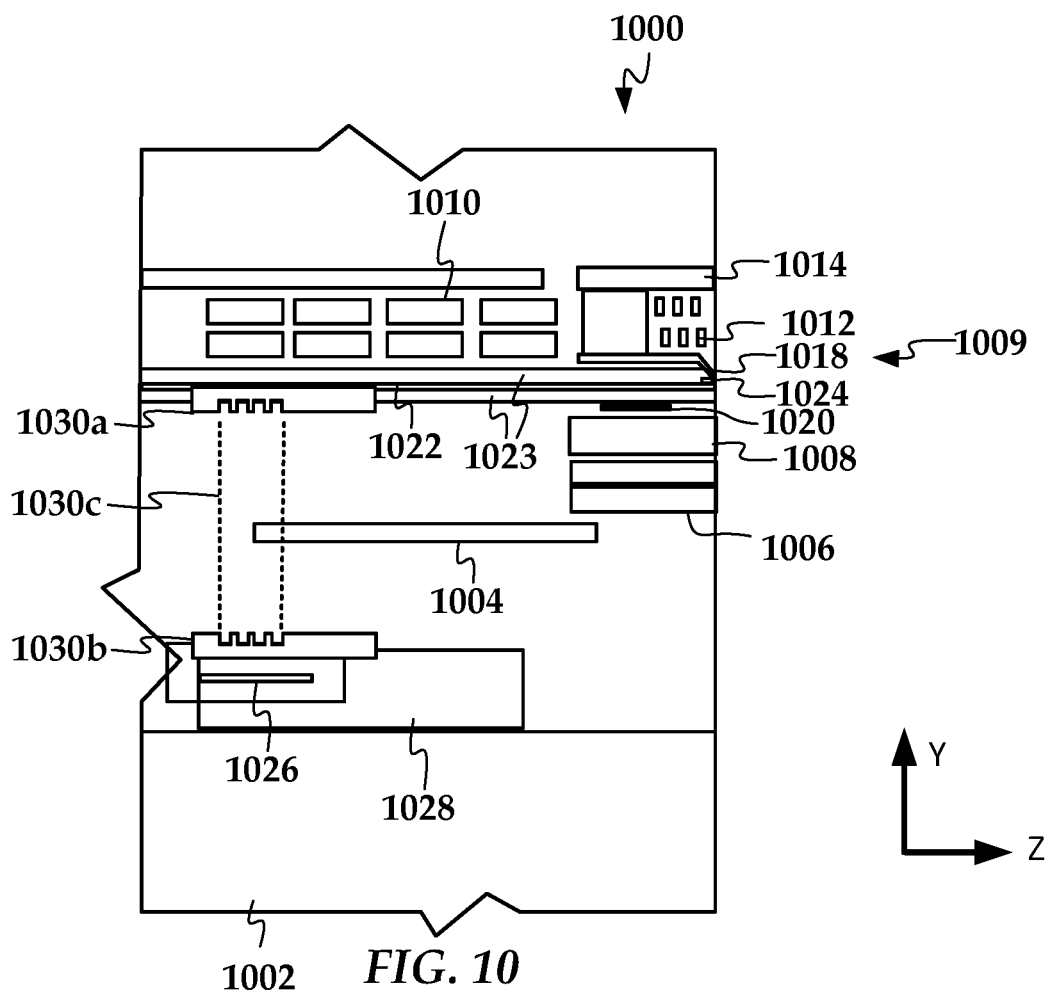
FIGS. 10 and 11 are respective cross-section and trailing edge views of an arrangement of a recording head according to a second example embodiment.
Figure 11:
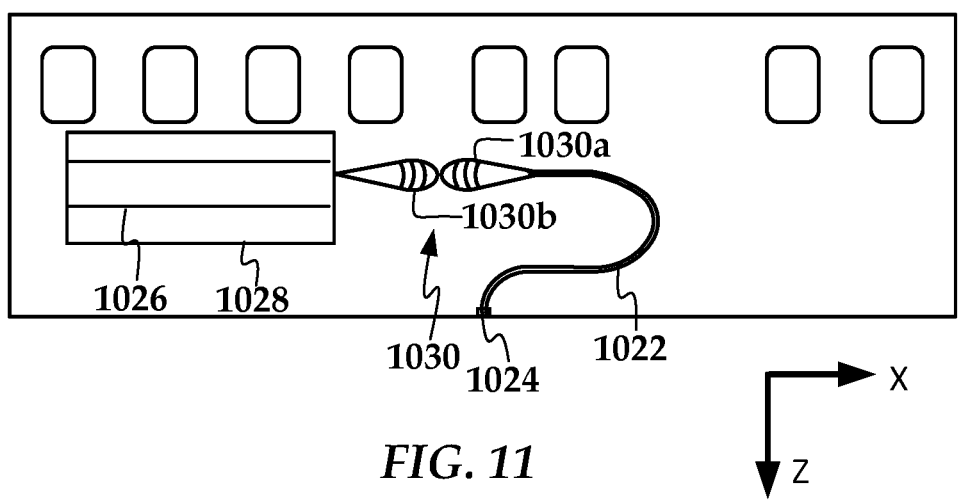

In FIGS. 10 and 11, respective cross-section and trailing edge views show an arrangement of a recording head 1000 according to a second example embodiment. The recording head 1000 is built upon a substrate 1002. A reader heater 1004 and read transducer 1006 are deposited over the substrate 1002. Above the read transducer 1006 is a return pole 1008 of a magnetic write transducer 1009 that also includes write pole 1018, coils 1010, 1012, and second return pole 1014. A writer heater 1020, waveguide core 1022, waveguide cladding 1023, and NFT 1024 are also shown. Unless otherwise indicated, the recording head 1000 and constituent features/components shown in FIGS. 10 and 11 are similar to analogous components shown in FIGS. 8 and 9 and described above, and may be modified as indicated in the description of that embodiment.

An active laser region 1026 is deposited before the read transducer 1006 on or near the substrate 1002. The active laser region 1026 is part of a laser diode unit 1028 utilizing a non-self-supporting structure. An optical coupler 1130 is configured to receive light from the active region 1026 and couple the light to the waveguide core 1022. In this case, there is a down-track (y-direction) separation between the active laser region 1026 and the waveguide core 1022, so the optical coupler 1130 includes features, such as the illustrated gratings 1030*a-b*, that direct the light in the down-track direction. In other configurations, mirrors can be used instead of the gratings 1030*a-b*, or a mixture of mirrors and gratings can be used. As an example of the latter, a mirror could be used in place of grating 1030*b* to direct light out of the laser diode unit 1028, while grating 1030*a* is used to receive light reflected from the mirror. A down-track oriented waveguide may also be included, as indicated by region 1030*c* in FIG. 10.

As with previous examples, the active region 1026 is elongated in the cross-track direction (x-direction), and so the waveguide core 1022 has a curved shape. Other optical components (e.g., a mode converter) may also be placed along the waveguide core 1022. The arrangement shown in FIGS. 10 and 11 has a less straightforward light path compared to some other embodiments, as the active region 1026 and waveguide core 1022 are on relatively distant layers. Optical grade materials may be needed from the substrate 1002 up to the waveguide layers 1022, 1023. The laser diode unit 1028 is inserted (e.g., transfer printed) at or near the beginning of the build, which can increase costs. The proximity to the substrate 1002 can result in good thermal and mechanical coupling between the substrate 1002 and the laser diode unit 1028. This coupling can ensure good heatsinking of the laser diode unit 1028, as well as minimizing thermally-induced strain. The location of the laser diode unit 1028 away from the read and write transducers means that there is no increase in reader-to-writer separation.

Figure 12:
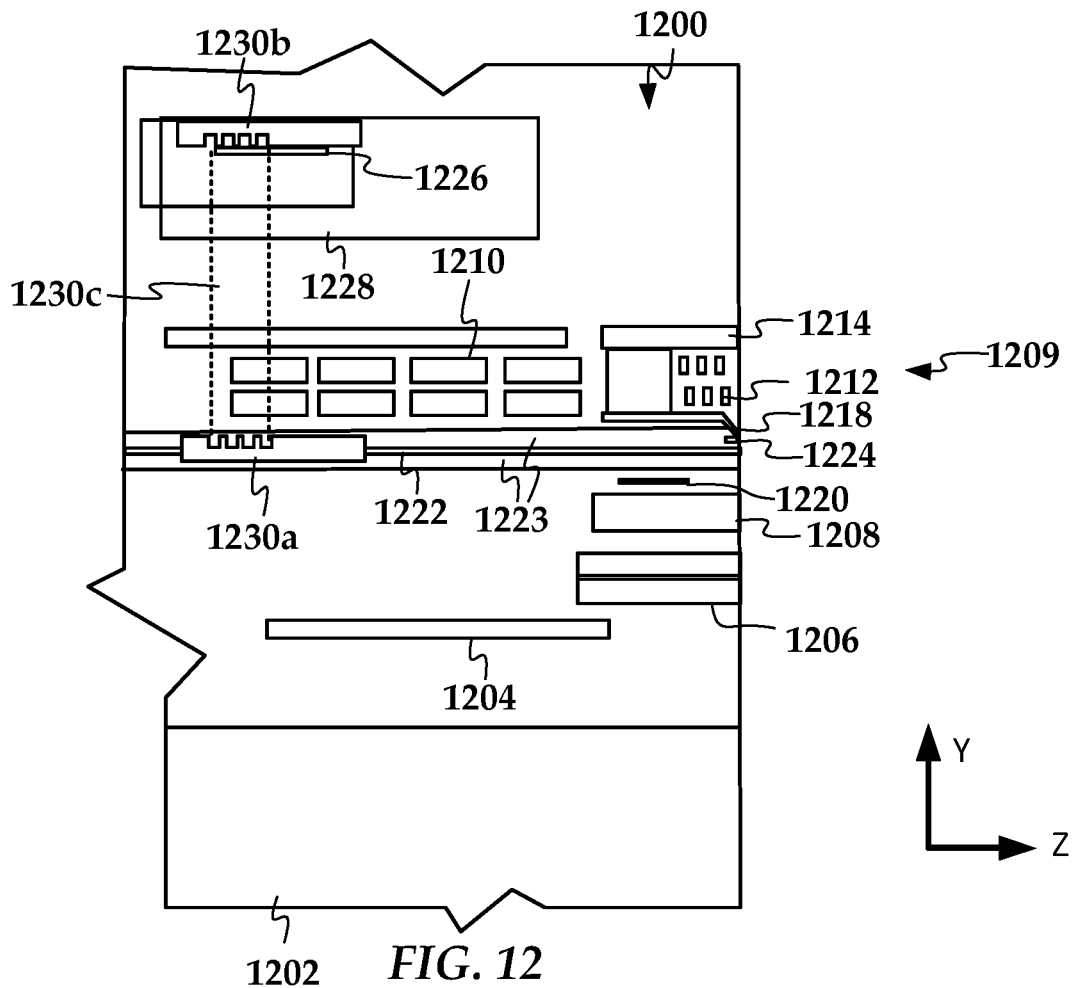
FIGS. 12 and 13 are respective cross-section and trailing edge views of an arrangement of a recording head according to a third example embodiment.
Figure 13:
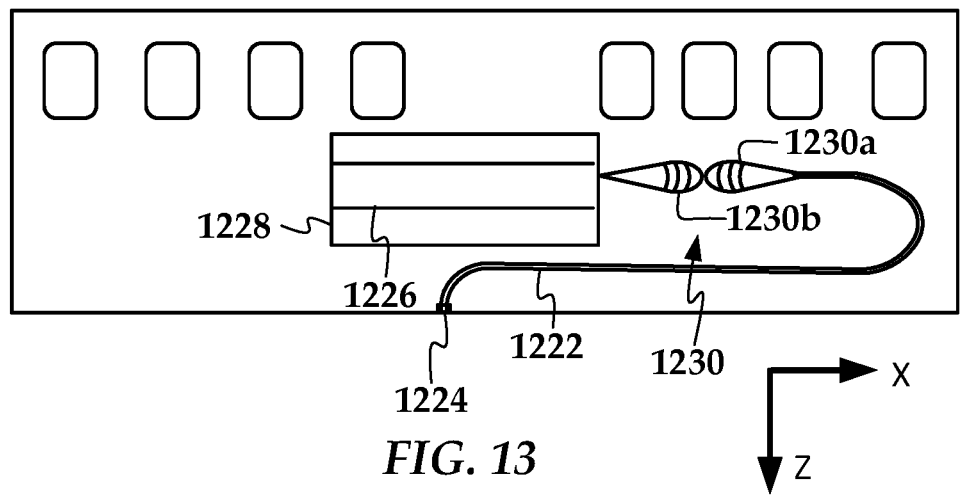

In FIGS. 12 and 13, respective cross-section and trailing edge views show an arrangement of a recording head 1200 according to a third example embodiment. The recording head 1200 is built upon a substrate 1202. A reader heater 1204 and read transducer 1206 are deposited over the substrate 1202. Above the read transducer 1206 is a return pole 1208 of a magnetic write transducer 1209 that also includes write pole 1218, coils 1210, 1212, and second return pole 1214. A writer heater 1220, waveguide core 1222, waveguide cladding 1223, and NFT 1224 are also shown. Unless otherwise indicated, the recording head 1200 and constituent features/components shown in FIGS. 12 and 13 are similar to analogous components shown in FIGS. 8 and 9 and described above, and may be modified as indicated in the description of that embodiment.

An active laser region 1226 is deposited after the write transducer. The active laser region 1226 is part of a laser diode unit 1228. An optical coupler 1230 is configured to receive light from the active region 1226 and couple the light to the waveguide core 1222. In this case, there is a down-track (y-direction) separation between the active laser region 1226 and the waveguide core 1222, so the optical coupler 1230 includes features, such as the illustrated gratings 1230*a-b*, that direct the light in the down-track direction. In other configurations, mirrors can be used instead of the gratings 1230*a*-*b*, or a mixture of mirrors and gratings can be used. As an example of the latter, a mirror could be used in place of grating 1230*b* to direct light out of the laser diode unit 1228, while grating 1230*a* is used to receive light reflected from the mirror. A down-track oriented waveguide may also be included, as indicated by region 1230*c* in FIG. 10.

As with previous examples, the active region 1226 is elongated in the cross-track direction (x-direction), and so the waveguide core 1222 has a curved shape. Other optical components (e.g., a mode converter) may also be placed along the waveguide core 1222. The arrangement shown in FIGS. 12 and 13 has a less straightforward light path compared to some other embodiments, as the active region 1226 and waveguide core 1222 are on relatively distant layers and are also separated by a number of components of the write transducer 1209. As such, a down-track waveguide 1230*c* may be positioned to extend between the some of the write coils 1210 without intersecting the write coils 1210. Optical grade materials may be needed from the waveguide layers 1222, 1223 to the overcoat. The laser diode unit 1228 is inserted (e.g., transfer printed) at or near the end of the build, which can decrease costs. Heatsinking and strain relief features may need to be added. The location of the laser diode unit 1228 away from the read and write transducers means that there is no increase in reader-to-writer separation.

Figure 14:
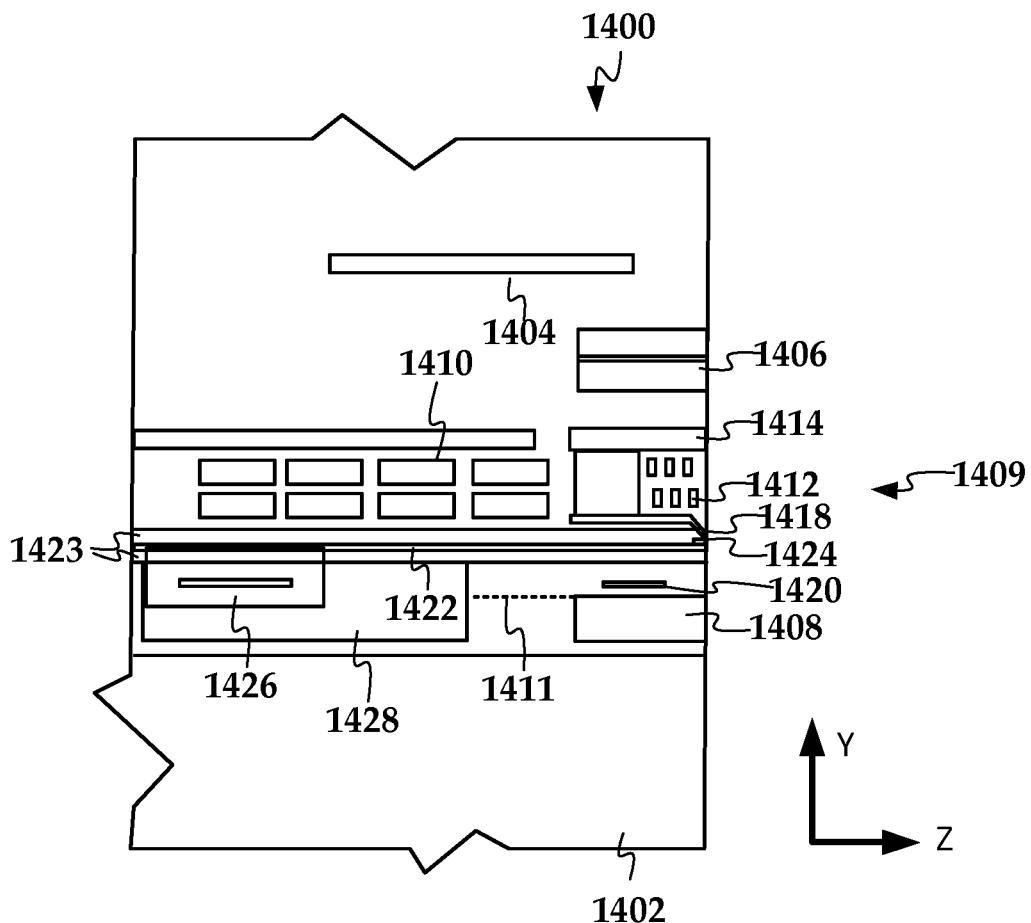
FIGS. 14 and 15 are respective cross-section and trailing edge views of an arrangement of a recording head according to a fourth example embodiment.
Figure 15:
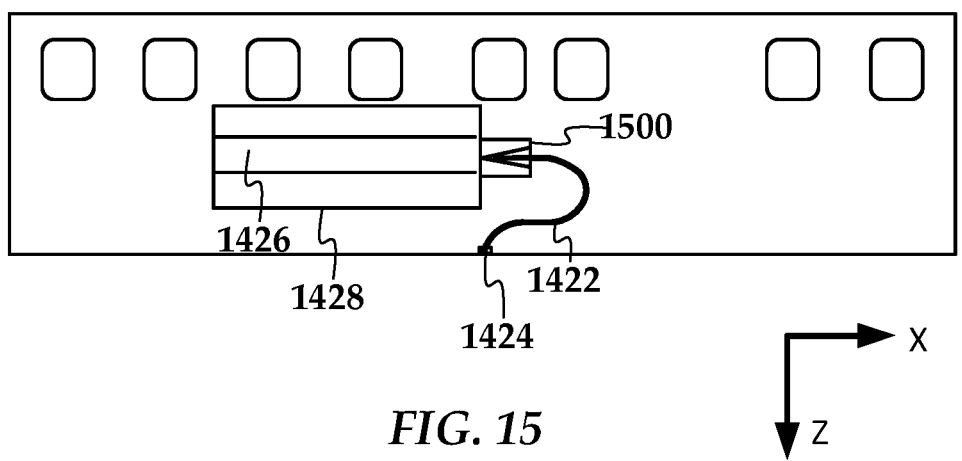

In FIGS. 14 and 15, respective cross-section and trailing edge views show an arrangement of a recording head 1400 according to a fourth example embodiment. The recording head 1400 is built upon a substrate 1402. In this example, the writer is deposited before the reader. A return pole 1408 of a magnetic write transducer 1409 is deposited on a substrate 1402. The magnetic write transducer 1409 also includes write pole 1418, coils 1410, 1412, and second return pole 1414. A writer heater 1420, waveguide core 1422, waveguide cladding 1423, and NFT 1424 are also shown. A reader heater 1404 and read transducer 1406 are deposited over the write transducer. Unless otherwise indicated, the recording head 1400 and constituent features/components shown in FIGS. 12 and 13 are similar to analogous components shown in FIGS. 8 and 9 and described above, and may be modified as indicated in the description of that embodiment.

An active laser region 1426 is deposited below the waveguide core 1422. The active laser region 1426 is part of a laser diode unit 1428. A substrate-parallel plane 1411 of the return pole 1408 intersects the laser diode unit 1428. An optical coupler 1500 is configured to receive light from the active region 1426 and couple the light to the waveguide core 1422. In this case, the coupler 1500 is similar to coupler 900 shown in FIG. 9, although gratings and/or mirrors may be used as described in other embodiments. As with previous examples, the active region 1426 is elongated in the cross-track direction (x-direction), and so the waveguide core 1422 has a curved shape. Other optical components may also be placed along the waveguide core 1422, such as a mode converter.

The arrangement shown in FIGS. 14 and 15 has a straightforward light path compared to some other embodiments due to the proximity of the active region 1426 and waveguide core 1422. Optical grade materials may be needed from the substrate 1402 up to the waveguide layers 1422, 1423. The laser diode unit 1428 is inserted (e.g., transfer printed) at or near the beginning of the build, which can increase costs. Heatsinking and strain relief can be provided by mechanical and thermal coupling between the laser diode unit 1428 and substrate 1402. The location of the laser diode unit 1428 relative to the read and write transducers means that there is no increase in reader-to-writer separation.

Figure 16:
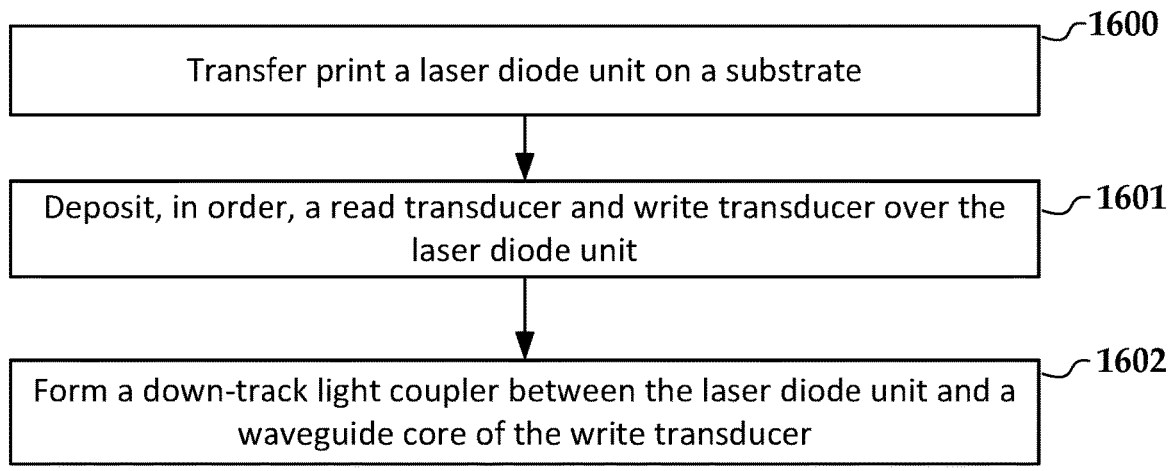
FIGS. 16, 17, 18, and 19 are flowcharts of methods according to example embodiments.

In FIG. 16, a flowchart shows a method according to an example embodiment. The method involves transfer printing 1600 a laser diode unit onto a substrate. A read transducer and write transducer are deposited 1601, in order, over the laser diode unit. A down-track light coupler is formed between the laser diode unit and a waveguide core of the write transducer. For example, gratings, mirrors, downtrack waveguides may be part of the light coupler. The light coupler may be formed during layering steps between transfer printing the laser diode and depositing of the write transducers.

Figure 17:
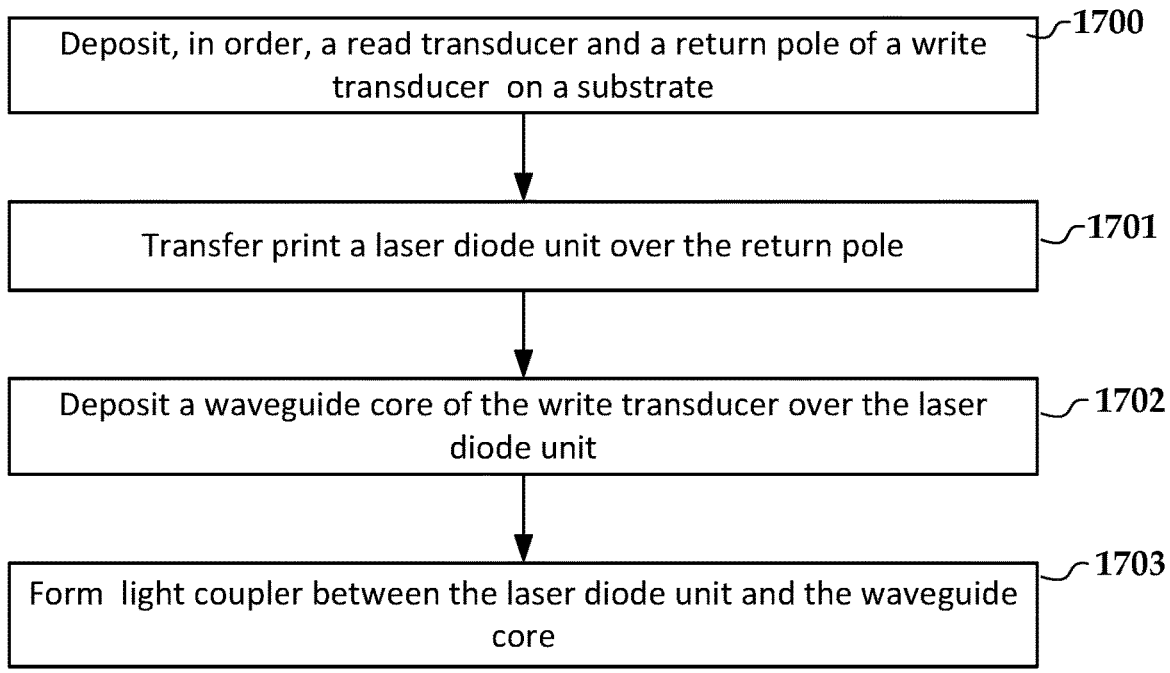

In FIG. 17, a flowchart shows a method according to another example embodiment. The method involves depositing 1700, in order on a substrate, a read transducer and a return pole of a write transducer. A laser diode unit is transfer printed 1701 over the return pole. A waveguide core of the write transducer is deposited 1702 over the laser diode unit. A light coupler is formed 1703 between the laser diode unit and the waveguide core.

Figure 18:
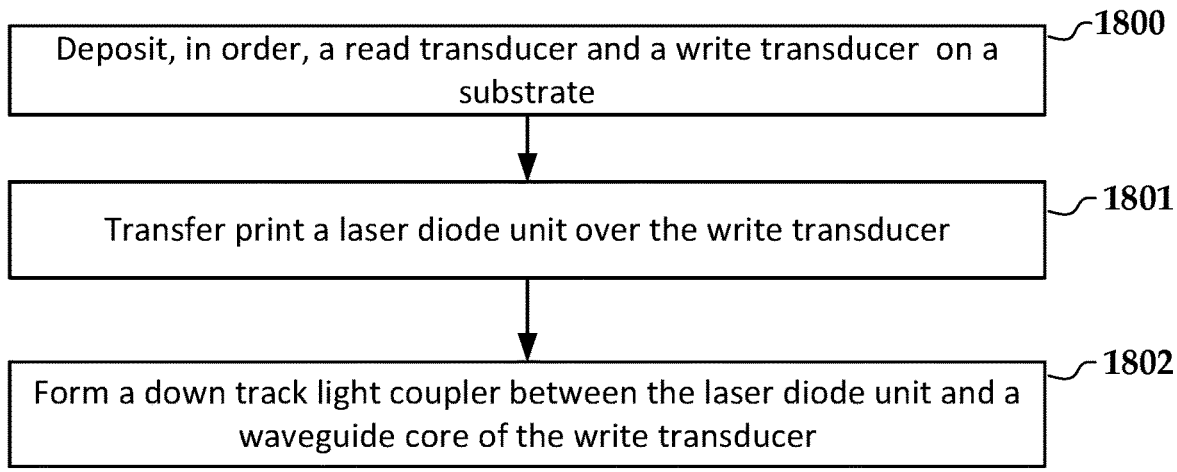

In FIG. 18, a flowchart shows a method according to another example embodiment. The method involves depositing 1800, in order on a substrate, a read transducer and a write transducer. A laser diode unit is transfer printed 1801 over the write transducer. A down track light coupler is formed between the laser diode unit and a waveguide core of the write transducer. The light coupler may be formed during layering steps used in forming the write transducer.

Figure 19:
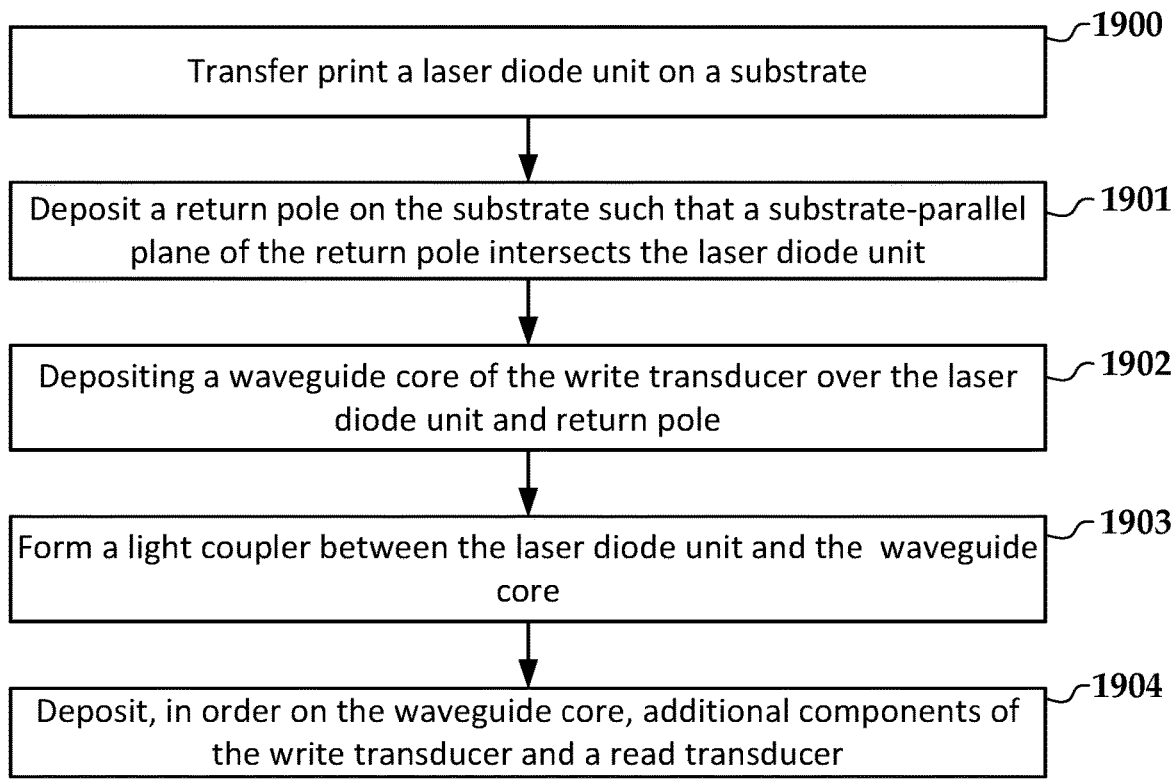

In FIG. 19, a flowchart shows a method according to another example embodiment. The method involves transfer printing 1900 a laser diode unit on a substrate A return pole is deposited 1901 on the substrate such that a substrate parallel plane of the return pole intersects the laser diode unit. A waveguide core of the write transducer is deposited 1902 over the laser diode unit and return pole. A light coupler is formed 1903 between the laser diode unit and the waveguide core. Additional components of the write transducer and a read transducer are deposited 1904, in order on the waveguide core.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head comprising:
   a substrate;
   a waveguide core deposited over the substrate;
   a near-field transducer at an end of the waveguide core proximate a media-facing surface;
   a magnetic write pole deposited over the waveguide core;
   a laser diode unit comprising one or more non-self-supporting layers of crystalline material region transfer printed below at least the waveguide core; and
   an optical coupler configured to receive light from the laser diode unit and couple the light to the waveguide core, the coupled light causing plasmons to be directed to a recording medium via the near-field transducer.

2. The recording head of claim 1, wherein the laser diode unit is elongated in a cross-track direction.

3. The recording head of claim 1, wherein further comprising a read transducer between the waveguide core and the substrate, and wherein the laser diode unit is transfer printed over the substrate before the read transducer.

4. The recording head of claim 3, wherein the laser diode unit is thermally coupled to the substrate such that the substrate provides heat sinking for the laser diode unit.

5. The recording head of claim 3, wherein the laser diode unit is mechanically coupled to the substrate such that the substrate reduces thermal strain on the laser diode unit.

6. The recording head of claim 3, wherein the optical coupler comprises at least one of gratings and mirrors that cause the light to propagate in a down-track direction.

7. The recording head of claim 1, wherein further comprising a read transducer between the waveguide core and the substrate, and wherein the laser diode unit is transfer printed between the read transducer and the waveguide core.

8. The recording head of claim 7, wherein the optical coupler comprises one of an assistant layer and a gradient index lens.

9. The recording head of claim 7, wherein an active region of the laser diode unit is co-planar with the waveguide core.

10. The recording head of claim 1, wherein the waveguide core comprises a curve that transitions from a cross-track direction proximate the active laser region to a direction normal the media-facing surface proximate the near-field transducer.

11. A recording head comprising:
a substrate;
a waveguide core deposited above the substrate;
a near-field transducer at an end of the waveguide core proximate a media-facing surface;
a magnetic write pole deposited above the wa.veguide core;
a laser diode unit comprising one or more non-self-supporting layers of crystalline material region transfer printed above the magnetic write pole; and
an optical coupler configured to receive light from the laser diode unit and couple the light to the waveguide core, the coupled light causing plasmons to be directed to a recording medium via the near-field transducer.

12. The recording head of claim 11, wherein the laser diode unit is elongated in a cross-track direction.

13. The recording head of claim 11, wherein the optical coupler comprises at least one of gratings and mirrors that cause the light to propagate in a down-track direction.

14. The recording head of claim 13, wherein the optical coupler comprises a down-track waveguide that extends between the coil without intersecting the coil.

15. The recording head of claim 11, wherein the waveguide core comprises a. curve that transitions from a cross-track direction proximate the laser diode unit to a direction normal the media-facing surface proximate the near-field transducer.

16. A recording head comprising:
a substrate;
a laser diode unit comprising one or more non-self-supporting layers of crystalline material region tra.nsfer printed over the substrate;
a return pole deposited over the substrate such that a substrate parallel plane of the return pole intersects the laser diode unit;
a waveguide core deposited over the return pole and the laser diode unit;
a near-field transducer at an end of the waveguide core proximate a media-facing surface;
a magnetic write pole and coil deposited above the wa.veguide core ; and
an optical coupler configured to receive light from the laser diode unit and couple the light to the waveguide core, the coupled light causing plasmons to be directed to a recording medium via the near-field transducer.

17. The recording head of claim 16, wherein the optical coupler comprises at least one of gratings and mirrors that cause the light to propagate in a down-track direction.

18. The recording head of claim 16, wherein the waveguide core comprises a curve that transitions from a cross-track direction proximate the laser diode unit to a direction normal the media-facing surface proximate the near-field transducer.

19. The recording head of claim 16, wherein the laser diode unit is elongated in a cross-track direction.

20. The recording head of claim 16, wherein the laser diode unit is thermally coupled to the substrate such that the substrate provides heat sinking for the laser diode unit.

* * * * *